(No Model.)
J. WARNER.
CONDUIT FOR CABLE ROADS.
No. 322,766. Patented July 21, 1885.
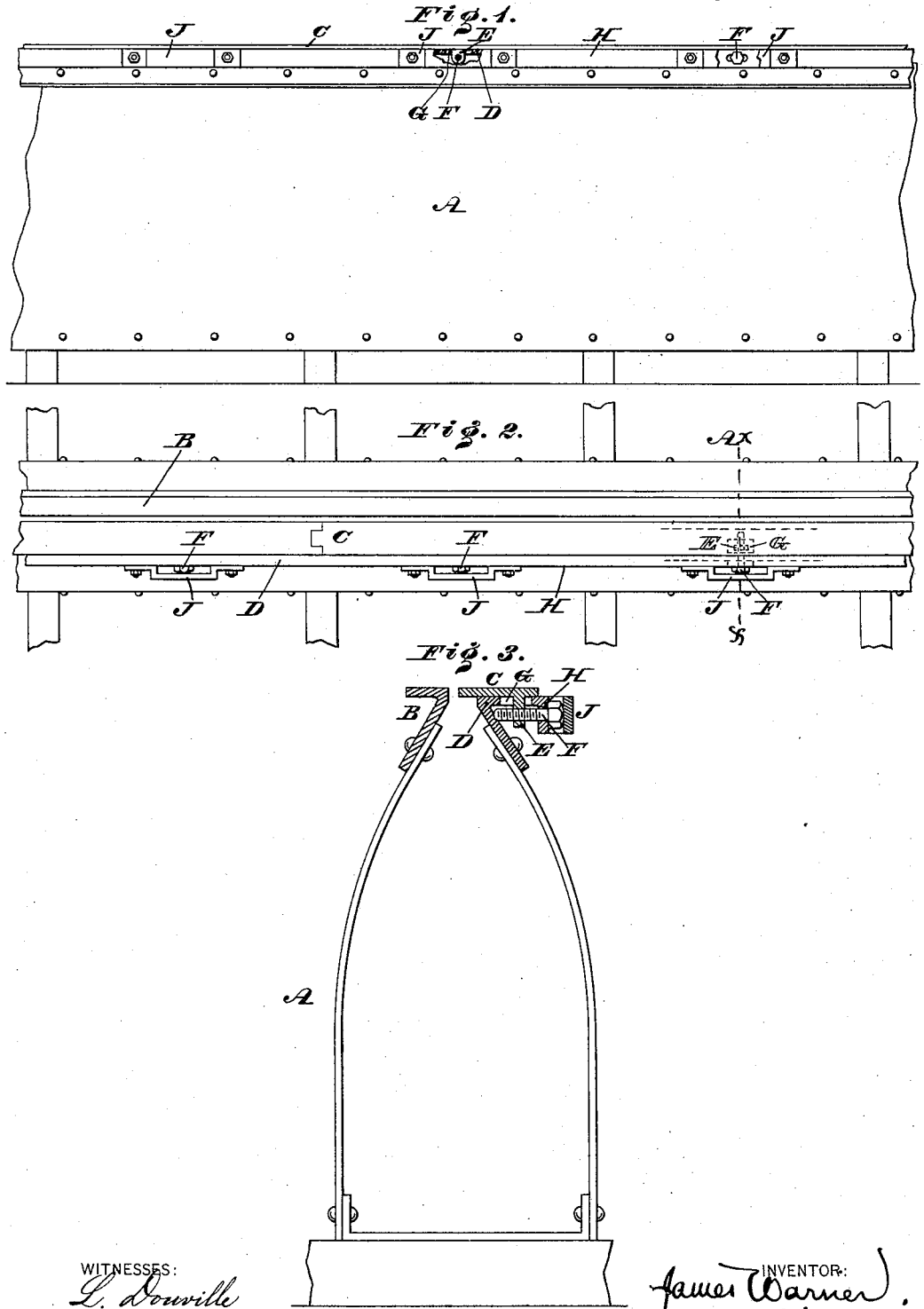

UNITED STATES PATENT OFFICE.

JAMES WARNER, OF PHILADELPHIA, PENNSYLVANIA.

CONDUIT FOR CABLE ROADS.

SPECIFICATION forming part of Letters Patent No. 322,766, dated July 21, 1885.

Application filed May 2, 1885. (No model.)

*To all whom it may concern:*

Be it known that I, JAMES WARNER, a subject of the Queen of Great Britain, having resided one year last past in the United States, and made oath of intention to become a citizen, a resident of the city and county of Philadelphia, State of Pennsylvania, have invented a new and useful Improvement in Conduits for Cable Roads, which improvement is fully set forth in the following specification and accompanying drawings, in which—

Figure 1 represents a top or plan view of a conduit for cable roads embodying my invention. Fig. 2 represents a side elevation thereof. Fig. 3 represents a vertical section in line $x\ x$, Fig. 2, on an enlarged scale.

Similar letters of reference indicate corresponding parts of the several figures.

My invention consists of a conduit for a cable road having its slot adapted to be adjusted in width, as will be hereinafter fully set forth.

Referring to the drawings, A represents a conduit for a cable road, the same having sides and a bottom of suitable metal or material properly bolted, riveted, or otherwise secured together.

B C represent the slot-irons, the iron B being stationary and the iron C movable to and from the iron B, whereby the width of the slot may be adjusted. The iron C rests on a plate or flange, D, projecting from the top of the side of the conduit and formed therewith or secured thereto in any suitable manner.

Depending from the iron C are ears E, having threaded openings with which engage the screw-bolts F, it being noticed that the iron D is formed with transversely-extending slots G, which receive said ears and permit the play of the same during the adjustment of the iron C.

At the outer side of the plate D is a depending flange, H, to which the bolts F are swiveled, whereby, by the rotation of said bolts, the ears E may be moved in the slots G, the iron C, as is evident, moving with said ears.

It will be seen that the width of the slot of the slot-irons may be increased or decreased by properly rotating the bolts, so that the same may be adjusted relatively to the nature of the grip, the action of heat and cold on the slot-irons, and other necessities of the case, this being accomplished without entering the conduit or removing the slot-irons, it being noticed that the heads of the bolts F, when uncovered, may be readily reached and operated by a wrench or key from the top of the street.

In order to retain the bolts in position on the flange D and guard the heads of the same, I employ keepers J, which are secured to the said flange and overlap the heads of the bolts, so that said heads abut against said keepers, without, however, preventing the bolts from rotating freely in the openings or slots K in the flange and operating the ears E, said keepers, in connection with the flange H, serving to swivel the bolts F in position.

In order to permit the longitudinal expansion and contraction of the iron C, the openings or slots K in the flange H are enlarged in the direction of the length of the iron, so that the bolts F are permitted to move in said openings as the iron expands and contracts.

If desired, the slot-iron B may be adjustable similarly to the iron C. The ends of the irons are prevented from lateral displacement by having mortised joints, as seen in Fig. 2.

Having thus described my invention, what I claim as new, and desire to secure by Letters Patent, is—

1. A conduit for a cable road having the slotted plate D, in combination with the movable iron C, having ears E, and resting on said slotted plate D, substantially as described.

2. In a conduit for a cable road, the slotted plate D, having flange H, in combination with movable iron C, having ears E, and bolts F, swiveled in said flange H, substantially as and for the purpose set forth.

3. In a conduit for a cable road, the slotted plate D, having slot G, and depending flange H, in combination with movable iron C, having depending ear E, working in said slot G, and screw-bolt F, swiveled in the flange H, and playing or operating in a threaded opening in the ears E, substantially as and for the purpose set forth.

4. In a conduit for a cable road, a movable slot-iron, a supporting-plate therefor, bolts connected with said plate and engaging with the slot-iron, and keepers connected with the plate, inclosing the heads of the bolts, substantially as and for the purpose set forth.

JAMES WARNER.

Witnesses:
JOHN A. WIEDERSHEIM,
JNO. K. PLITT.